(12) United States Patent
Nagata

(10) Patent No.: US 11,124,070 B2
(45) Date of Patent: Sep. 21, 2021

(54) CONFIGURABLE DASHBOARD FOR AN OFF-ROAD VEHICLE

(71) Applicant: Toyota Motor Engineering & Manufacturing North America, Inc., Plano, TX (US)

(72) Inventor: Katsumi Nagata, Foster City, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/773,717

(22) Filed: Jan. 27, 2020

(65) Prior Publication Data

US 2021/0229552 A1    Jul. 29, 2021

(51) Int. Cl.
*B60K 35/00* (2006.01)
*B60W 50/14* (2020.01)

(52) U.S. Cl.
CPC ........ *B60K 35/00* (2013.01); *B60K 2370/155* (2019.05); *B60K 2370/167* (2019.05); *B60K 2370/168* (2019.05); *B60K 2370/169* (2019.05); *B60K 2370/176* (2019.05); *B60R 2300/303* (2013.01); *B60W 2050/146* (2013.01)

(58) Field of Classification Search
CPC combination set(s) only.
See application file for complete search history.

(56) References Cited

U.S. PATENT DOCUMENTS

| | | | |
|---|---|---|---|
| 4,206,935 A | 6/1980 | Sheppard et al. | |
| 4,349,809 A | 9/1982 | Tomes | |
| 6,356,837 B1 | 3/2002 | Yokota et al. | |
| 6,580,373 B1 | 6/2003 | Ohashi | |
| 6,836,725 B2 | 12/2004 | Millington et al. | |
| 8,983,717 B2* | 3/2015 | Pupin | H04N 7/181 701/36 |
| 9,399,473 B2 | 7/2016 | Hoare et al. | |
| 9,404,749 B2 | 8/2016 | Hill et al. | |
| 9,440,659 B2* | 9/2016 | Kelly | B60W 10/20 |
| 9,644,969 B2 | 5/2017 | Koenig et al. | |

(Continued)

OTHER PUBLICATIONS

Alpine Electronics: X209-WRA-OR 9" Restyle Navigation System, The Jeep Wrangle (2011-2018).

*Primary Examiner* — Hai Phan
*Assistant Examiner* — Anthony D Afrifa-Kyei
(74) *Attorney, Agent, or Firm* — Snell & Wilmer LLP

(57) ABSTRACT

Methods, systems, and apparatus for a configurable dashboard. The configurable dashboard system includes a sensor configured to detect or measure sensor data that includes a first parameter related to the off-road vehicle. The configurable dashboard system includes a user interface configured to display visualizations of parameters related to the off-road vehicle and images related to the off-road vehicle. The configurable dashboard system includes a processor coupled to the sensor and the user interface. The processor is configured to obtain, from the sensor, the first parameter related to the off-road vehicle. The processor is configured to render on the user interface a first visualization of the first parameter. The processor is configured to obtain, using the user interface, a selection of a second parameter related to the off-road vehicle. The processor is configured to render on the user interface a second visualization of the second parameter.

20 Claims, 6 Drawing Sheets

(56) References Cited

U.S. PATENT DOCUMENTS

| | | |
|---|---|---|
| 2004/0220730 A1 | 11/2004 | Chen et al. |
| 2015/0234580 A1 | 8/2015 | Secord et al. |
| 2015/0271452 A1 | 9/2015 | Guzman |
| 2019/0279512 A1* | 9/2019 | Daniel .................. B60Q 9/008 |

* cited by examiner

CONFIGURABLE DASHBOARD FOR AN OFF-ROAD VEHICLE

BACKGROUND

Field

The present disclosure relates to systems and methods for a configurable dashboard for an off-road vehicle.

Description of the Related Art

Generally, vehicles may display or show various parameters of the vehicle to a driver or other occupant of the vehicle. For example, a display in the vehicle may show the tire pressure, state of charge of the battery or fuel cell that powers the vehicle, the average or instantaneous gas mileage, the average or instantaneous vehicle speed or other parameter of the vehicle and/or road trip. These displays, however, are pre-configured at the factory with various menus that each have a specific set of visualizations or graphics of specific parameters of the vehicle and/or the road trip. Thus, when a driver or occupant toggles or selects the menu, the driver or occupant is presented with a specific set of visualizations or graphics that display specific parameters. This specific set of visualizations or graphics of the specific parameters is non-configurable. That is, the specific set of visualizations or graphics of the specific parameters that correspond with the specific menu can not be changed or modified with a different set of visualizations or graphics.

Moreover, generally, the specific parameters and alerts that are shown on a display of a vehicle relate to more conventional driving on a roadway and/or road trip and do not include customizable screens that are specific to off-road driving and other special interests.

Accordingly, there is a need for a system and a method for customizing displays to present parameters and metrics related to off-road driving and other user preferences or interests.

SUMMARY

In general, one aspect of the subject matter described in this disclosure may be embodied in a configurable dashboard system for an off-road vehicle. The configurable dashboard system includes a sensor configured to detect or measure sensor data that includes a first parameter related to the off-road vehicle. The configurable dashboard system includes a user interface configured to display visualizations of parameters related to the off-road vehicle and images related to the off-road vehicle. The configurable dashboard system includes a processor coupled to the sensor and the user interface. The processor is configured to obtain, from the sensor, the first parameter related to the off-road vehicle. The processor is configured to render on the user interface a first visualization of the first parameter. The processor is configured to obtain, using the user interface, a selection of a second parameter related to the off-road vehicle. The processor is configured to render on the user interface a second visualization of the second parameter.

These and other embodiments may optionally include one or more of the following features. The configurable dashboard system may include a navigation unit. The navigation unit may be configured to obtain a current location of the off-road vehicle and map data. The processor may be coupled to the navigation unit and may be configured to compare the current location of the off-road vehicle to the map data. The processor may be configured to determine that the off-road vehicle is off-roading. The processor may be configured to render the first visualization of the first parameter in response to the determination that the off-road vehicle is off-roading.

The sensor may be a traction sensor. The traction sensor may be configured to measure an amount of traction or wheel sip of a wheel. The one or more parameters may include the amount of traction or slip of each wheel of the multiple wheels of the off-road vehicle.

The configurable dashboard system may include a front-view camera. The front-view camera may be configured to capture a first image of an environment in a path of the off-road vehicle. The processor may be configured to render on the user interface the first imaging along with the first visualization of the first parameter. The processor may be configured to swap on the user interface either the first image or the first visualization with the second visualization of the second parameter so that the second visualization may be rendered on the user interface with the other of the first image or the first visualization.

The configurable dashboard system may include a memory. The memory may be configured to store one or more configuration settings. The one or more configuration settings may indicate the visualizations of parameters and the images to display on the user interface along with a corresponding position for each visualization and each image. The processor may be coupled to the memory. The processor may be configured to receive the one or more configuration settings. The processor may be configured to render on the user interface the first visualization at a first position. The processor may be configured to render on the user interface the first image at a second position. The processor may be configured to receive user input. The user input may indicate a selection and movement of the first visualization from a first location to a second location. The processor may be configured to move on the user interface the first visualization from the first location to the second location.

The first parameter and the second parameter may include at least one of an amount of traction or wheel slip of each wheel of the multiple wheels of the off-road vehicle, an amount of oscillation, vibration or shock to a suspension of each wheel of the multiple wheels of the off-road vehicle or an amount of viewing area on each window of the off-road vehicle.

In another aspect, the subject matter may be embodied in a configurable dashboard system for an off-road vehicle. The configurable dashboard system includes a first sensor and a second sensor. The first sensor is configured to detect a first parameter related to the off-road vehicle. The second sensor is configured to detect a second parameter related to the off-road vehicle. The configurable dashboard system includes a graphical user interface. The graphical user interface is configured to display visualizations of parameters and images related to the off-road vehicle or off-road trip. The configurable dashboard system includes a processor coupled to the first sensor, the second sensor and the graphical user interface. The processor is configured to render on the graphical user interface a first visualization of the first parameter at a first position on the graphical user interface and a second visualization of the second parameter at a second position on the graphical user interface. The processor is configured to obtain a selection of a first image or a third visualization and render on the graphical user interface the first image or the third visualization at a third position.

In another aspect, the subject matter may be embodied in a method of displaying parameters and images related to off-roading. The method includes directing or measuring, by a first sensor, a first parameter related to a vehicle that is off-road. The method includes rendering, by a processor and on a display, a first visualization of the first parameter. The method includes obtaining, using the user interface, a selection of a second parameter related to the off-road vehicle. The method includes detecting or measuring, by a second sensor, the second parameter related to the vehicle that is off-road. The method includes rendering, by the processor and on the display, a second visualization of the second parameter along with the first visualization.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for a configurable dashboard for an off-road vehicle. Particular embodiments of the subject matter described in this disclosure may be implemented to realize one or more of the following advantages. The configurable dashboard system may automatically determine that the vehicle is off a conventional roadway or in a particular area where the driver or occupant has a preference to display specific information on the display. Once the configurable dashboard system determines that the vehicle is in a particular area where the driver or occupant desires to show the specific information, the configurable dashboard may reconfigure the information on the display to show the specific information. For example, the configurable dashboard system may determine that the vehicle is off-road, and thus, may display visualizations of parameters and/or images related to off-roading. Different parameters related to off-roading include the traction or slip of wheels of the vehicle on a surface, roll, tilt, shock, oil level, state of charge, temperature of different vehicle components and/or other variables of components of the vehicle that are affected when the vehicle is off-road. This automatic reconfiguration allows the dashboard of the vehicle to automatically display relevant information that corresponds to the user's preferences and the specific location of the vehicle.

Other benefits and advantages include the capability to configure and reconfigure the dashboard to display various visualizations and images. The configurable dashboard system may be configured and/or reconfigured to display multiple visualizations and images. The multiple visualizations and images may be related to the parameters of the off-road vehicle and/or image views of the off-road vehicle. The various visualizations and images may be modified or otherwise tailored, such as by changing the position or location of the visualization or image within the display, to show various parameters and/or images related to vehicle and/or event. The various visualizations and images may be changed or swapped out with other visualizations and/or images related to the vehicle and/or event. For example, a first image that shows the path behind the vehicle may be swapped out on the display with a second image that shows the path in front of the vehicle and/or a third image that shows the environment near the wheels of the vehicle. This allows the dashboard to be reconfigured based on user preferences and the environment surrounding the vehicle.

Figure 1:
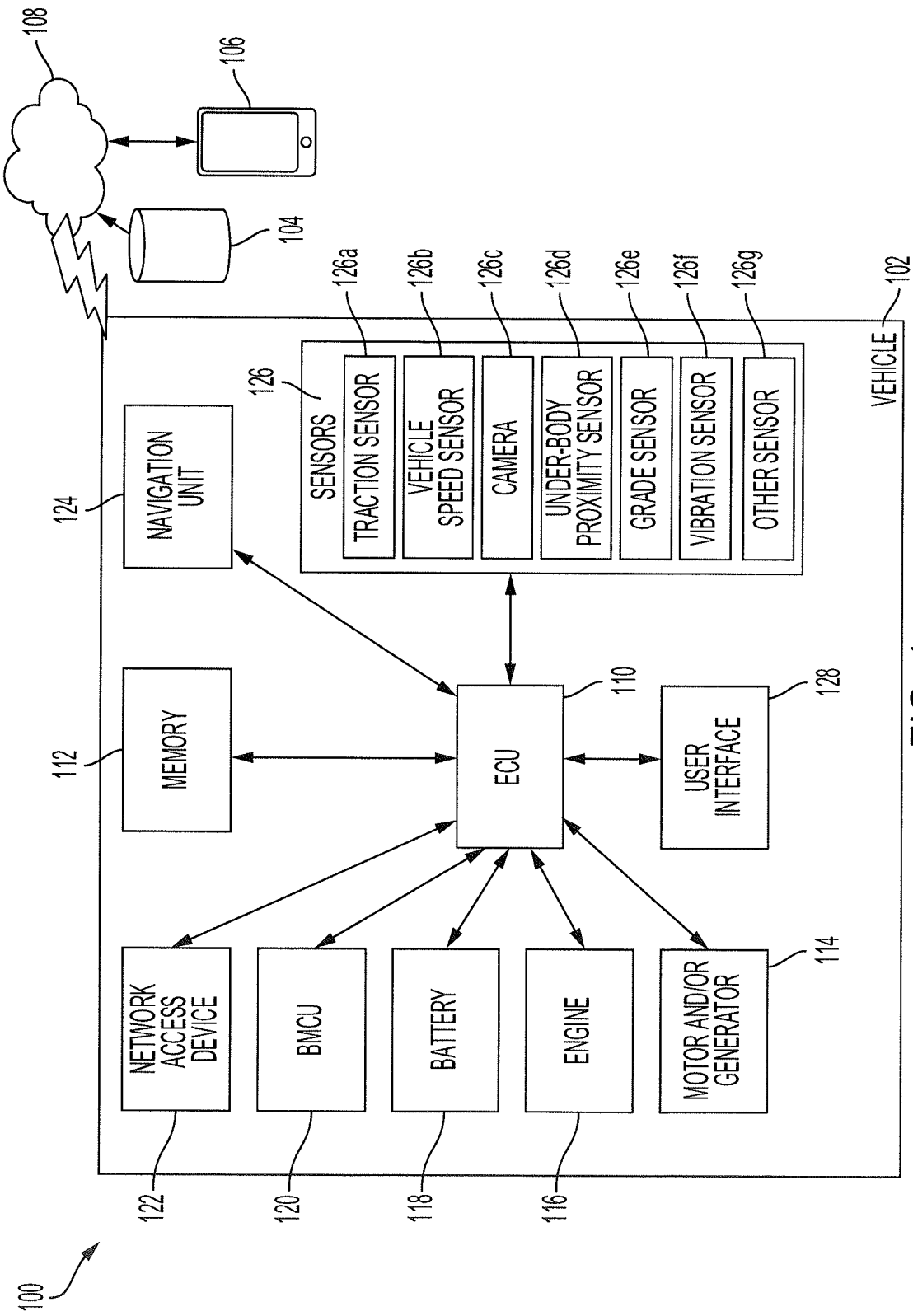
FIG. 1 is a block diagram of an example configurable dashboard system according to an aspect of the invention.

FIG. 1 is a block diagram of a configurable dashboard system (or "dashboard system") 100. The dashboard system 100 may be retro-fitted, coupled to, include or be included within a vehicle 102. The configurable dashboard system 100 may couple, connect to, or include one or more other devices or entities, such an external database 104 and/or a user device 106, such as a smartphone, a tablet, a personal computer, a wearable device or other personal computing device. The dashboard system 100 may have a network 108 that links the components of the dashboard system 100 with the external database 104 and/or the user device 106. The network 108 may be a Dedicated Short-Range Communication (DSRC) network, a local area network (LAN), a wide area network (WAN), a cellular network, the Internet, or combination thereof, that connects, couples and/or otherwise communicates among the multiple entities.

The dashboard system 100 may display a graphical representation of various parameters and/or images related to an off-road vehicle and/or an off-road trip (hereinafter, referred to as "off-road data"). The dashboard system 100 may have a reconfigurable display that shows the various parameters and/or images and may be customizable to include different combinations and/or configurations of visualizations of the various parameters and/or images related to the off-road data.

The dashboard system 100 determines when the vehicle 102 is off-road and collects, detects and determines various parameters and images related to the off-road data. The dashboard system 100 displays visualizations of the various parameters and images related to the off-road data. The display of the dashboard system 100 may be reconfigured to show the various visualizations of the various parameters in different positions on the display. Moreover, the various visualizations may be added, removed and/or interchanged on the display so that different parameters related to the off-road data may be shown based on user preferences. This allows the driver or occupant of the vehicle 102 (hereinafter, referred to as the "user") to customize the display either in real-time or based on one or more pre-set user configuration settings.

The dashboard system 100 may include, be retro-fitted or otherwise coupled with or coupled to a vehicle 102. The vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous.

The dashboard system 100 include one or more electronic control units (ECUs) 110. The ECU 110 may be implemented as a single ECU or as multiple ECUs. The ECU 110 may be electrically coupled to some or all of the other components within the vehicle 102, such as the memory 112, the motor and/or generator 114, the engine 116, the battery 118, the battery management control unit (BMCU) 120, the memory 112, the network access device 122, the navigation unit 124, one or more vehicle sensors 126 and/or a user interface 128. The ECU 110 may include one or more processors or controllers specifically designed for sensing, detecting, measuring and/or otherwise determining or obtaining the various parameters that are related to off-road data, such as parameters related to an off-road vehicle or an off-road trip of the off-road vehicle. The ECU 110 may be coupled to a memory 112 and execute instructions that are stored on the memory 112.

The memory 112 may be coupled to the ECU 110 and store instructions that the ECU 110 executes. The memory 112 may include one or more of a Random Access Memory (RAM) or other volatile or non-volatile memory. The memory 112 may be a non-transitory memory or a data storage device, such as a hard disk drive, a solid-state disk drive, a hybrid disk drive, or other appropriate data storage, and may further store machine-readable instructions, which may be loaded and executed by the ECU 110. The memory 112 may store one or more configuration settings that indicate the one or more visualizations of the one or more parameters related to the off-road data and the one or more images related to the off-road data to display on the user interface 128. The one or more configuration settings may also indicate a position and/or an order for each of the one or more visualizations and the one or more images on the user interface 128.

Figure 2:
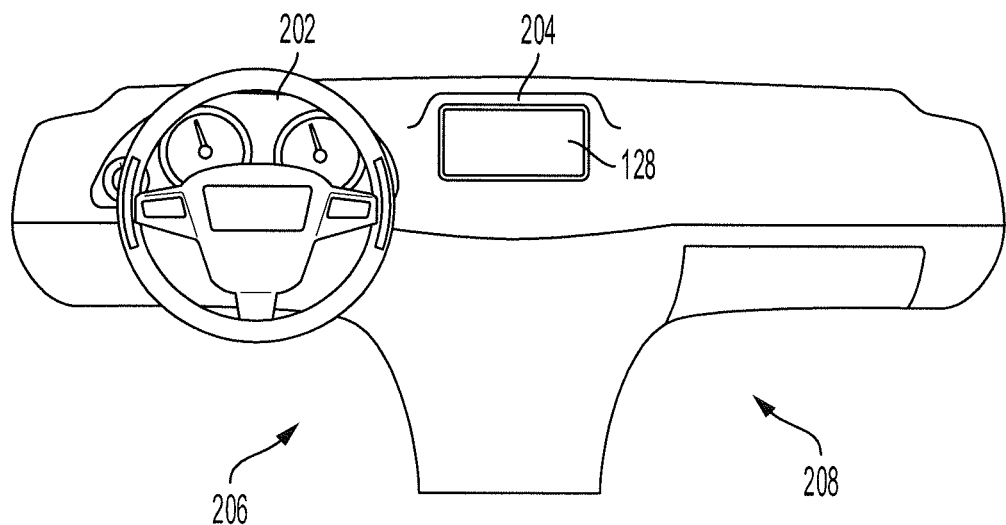
FIG. 2 shows the user interface of the dashboard system of FIG. 1 positioned within the vehicle according to an aspect of the invention.

The dashboard system 100 includes a user interface 128. The user interface 128 may be a dashboard interface positioned at the center of or within the driver-side dashboard 202 and/or may be a heads-up display (HUD) positioned within a portion 204 between the driver-side area 206 and the passenger-side area 208 in the front passenger compartment of the vehicle 102, as shown in FIG. 2 for example. The dashboard system 100 may display one or more notifications, alerts, and/or screens with one or more menus for selection of one or more parameters or image views, one or more visualizations related to the off-road data and/or images related to the off-road data. The one or more notifications or alerts may notify the user that the vehicle 102 is off-road and/or may indicate to the user when one or more parameters exceeds a threshold value, which indicates that the vehicle 102 is operating outside normal operating conditions. For example, the alert may indicate that the suspension of the vehicle 102 is unable to withstand the current shocks or vibrations that are being measured. The alert may be specifically related to the off-road vehicle (e.g., slip, traction, under-body clearance, tilt, shock, temperature of a vehicle component, battery voltage, engine oil level, engine oil pressure, transmission temperature, transmission oil level, transmission oil pressure, water temperature, pitch, roll, altitude, etc.).

The one or more screens may display a menu that allows selection of one or more parameters and/or one or more images to display. Once selected, the one or more screens may display the one or more visualizations that correspond to the one or more parameters and/or the one or more images that correspond to the one or more image views that were selected. The one or more visualizations may be a graphical representation or rendering of a corresponding parameter, such as an amount of traction or slip of each wheel of the vehicle 102 or a temperature of the engine oil within the engine 116. The one or more images may be captured video in front of the vehicle 102, a birds-eye view of the vehicle 102 and/or at the sides of the vehicle 102 so that the user may see or identify any obstacles in the path of the vehicle 102, such as a rock, crevice or hole in the ground surrounding or in the path of the vehicle 102.

The user interface 128 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 128 may receive user input that may include configuration settings for one or more user preferences and/or a selection of a parameter or visualization to add, remove and/or move, for example.

The dashboard system 100 may include one or more network access devices 122. The network access devices 122 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access devices 122 may transmit data to and receive data from other entities, such as the external database 104 and/or the user device 106.

The dashboard system 100 may include a navigation unit 124. The navigation unit 124 may be integral to the vehicle 102 or a separate unit coupled to the vehicle 102, such as a navigation unit (not shown) within the user device 106. The navigation unit 124 may communicate with the vehicle 102 via the network access device 122. In some implementations, the vehicle 102 may include a Global Positioning System (GPS) unit (not shown) for detecting location data including a current location of the vehicle 102 and date/time information instead of the navigation unit 124. In that regard, the ECU 110 may perform the functions of the navigation unit 124 based on data received from the GPS unit. At least one of the navigation unit 124 or the ECU 110 may predict or propose a route set that includes a starting location and a destination location. The navigation unit 124 or the ECU 110 may perform navigation functions. Navigation functions may include, for example, route and route set prediction, identifying roadways, terrain features, places of interest or other features, providing navigation instructions, and receiving user input such as verification of predicted routes and route sets or destinations.

The navigation unit 124 may provide and obtain navigational map information. The navigational map information may include a current location, a starting location, a destination location and/or a route between the starting location or current location and the destination location of the vehicle 102, and may include a memory (not shown) for storing route data. The navigation unit 124 may receive data from other sensors capable of detecting data corresponding to location information. For example, the other sensors may include a gyroscope or an accelerometer.

In some implementations, the navigational map information includes map data. The map data includes locations of one or more roadways, places of interest, structures, terrain features or other places of interest. The one or more roadways may include information on conventional private and/or public roadways that are paved and designed to support conventional or frequent travel of a vehicle 102. The one or more roadways may include unpaved roads, trails or other paths that support the occasional traversing of a vehicle 102 but are not designed for conventional travel that occurs regularly by a vehicle 102. The terrain features may include information on sand dunes, mountains or hills, waterways, rock features, forests, grass plains, wetlands, deserts or other geographic features not designed for the conventional or frequent traversing by a vehicle 102.

The dashboard system 100 may include one or more sensors 126. The one or more sensors 126 may include a traction sensor 126a, a vehicle speed sensor 126b, a camera 126c, an under-body proximity sensor 126d, a grade sensor 126e, a vibration sensor 126f and/or other sensor 126g. These sensors 126 collect sensor data associated with one or more parameters that are related to off-road data. For example, the sensor data may be related to the path of the vehicle 102 when the vehicle 102 is off-road, the performance of the vehicle 102 when the vehicle 102 is off-road and/or the durability of various components of the vehicle 102 affected when the vehicle 102 is travelling off-road, which may be of interest to the driver and/or occupant of the vehicle 102. The different parameters may be tilt, roll, traction, slip, state of charge of the vehicle 102, the speed of the vehicle 102 or other sensor data mentioned above or collected by the one or more sensors 126. And, each of these different parameters may have a threshold value that indicates a normal operating condition. When the parameters operate outside the normal operating condition, such as when the value of the parameters exceeds the threshold value, the dashboard system 100 may generate an alert. For example, when the under-body clearance between the under-side of the vehicle 102 and the surface underneath the vehicle 102 is less than a threshold amount, the dashboard system 100 may generate an alert.

The traction sensor 126a may detect, determine or measure a status of the traction and/or slip on all of the wheels of the vehicle 102. The status may be a measure of the traction or slip on each wheel individually and/or on all of the wheels in the aggregate. The vehicle speed sensor 126b may measure the wheel speed, such as the revolutions per minute (RPM), of all the wheels of the vehicle, either individually or in the aggregate. The under-body proximity sensor 126d may measure an amount of clearance and/or a distance from the under-side of the vehicle 102 to the ground or other object underneath the vehicle 102. The under-body proximity sensor 126d may be positioned on an under-side of the vehicle 102. The grade sensor 126e may measure or an indication of the level of the slope of the ground that the vehicle 102 is travelling or in the path of the vehicle 102. The vibration sensor 126f may measure an amount of shock or vibration to the suspension system of the vehicle 102. Other sensors 126g may include sensors that measure the battery voltage, engine oil level, engine oil pressure, transmission temperature, transmission oil level, the transmission oil pressure, water temperature, pitch, roll and/or altitude of the vehicle 102.

The one or more sensors 126 may include a camera 126c. The camera 126c may capture images including video of the external environment surrounding the vehicle 102 and/or internal environment within the passenger compartment of the vehicle 102. The camera 126c may be a wireless action camera that is positioned within the front passenger compartment of the vehicle 102 to capture reactions of the driver and/or occupants within the vehicle 102. The wireless action camera may be used to record facial expressions and reactions of the driver and/or occupants while the vehicle 102 is off-road. The camera 126c may positioned to capture a birds-eye view, a frontal view and/or a side view of the vehicle 102 as the vehicle 102 is travelling off-road. The different views of the vehicle 102 allow the camera to capture the external environment surrounding the vehicle 102 to identify any obstacles or hazards in the path or surrounding the vehicle 102. For example, the camera 126c may capture a boulder lodged near a wheel of the vehicle 102 or in the path of the vehicle 102.

The dashboard system 100 may couple, connect to, and/or include one or more vehicle components. The one or more vehicle components may include a motor and/or generator 114. The motor and/or generator 114 may convert electrical energy into mechanical power, such as torque, and may convert mechanical power into electrical energy. The motor and/or generator 114 may be coupled to the battery 118. The motor and/or generator 114 may convert the energy from the battery 118 into mechanical power, and may provide energy back to the battery 118, for example, via regenerative braking. In some implementations, the vehicle 102 may include one or more additional power generation devices such as the engine 116 or a fuel cell stack (not shown). The engine 116 combusts fuel to provide power instead of and/or in addition to the power supplied by the motor and/or generator 114.

The battery 118 may be coupled to the motor and/or generator 114 and may provide electrical energy to and receive electrical energy from the motor and/or generator 114. The battery 118 may include one or more rechargeable batteries.

The BMCU 120 may be coupled to the battery 118 and may control and manage the charging and discharging of the battery 118. The BMCU 120, for example, may measure, using battery sensors, parameters used to determine the state of charge (SOC) of the battery 118. The BMCU 120 may control the battery 118 to maintain a reserve power explicitly for providing a sudden burst of electrical energy to be converted into power for the transmission to drive or move the multiple wheels of the vehicle 102.

The dashboard system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a map database that provide map data. The map data includes maps of roadways, geographic locations of structures, terrain information and points of interest. The information included within the maps may include the location of one or more roadways, structures, terrain features and/or points of interest. The maps may be used in conjunction with the navigational map information to determine when a vehicle 102 is off-road. A vehicle 102 may be off-road when the vehicle is not traveling on a public roadway, such as when the vehicle 102 is travelling on an unpaved road or trail, on the beach or on other natural terrain, e.g., desert, grassland or other plain not associated with a public roadway.

Figure 3:
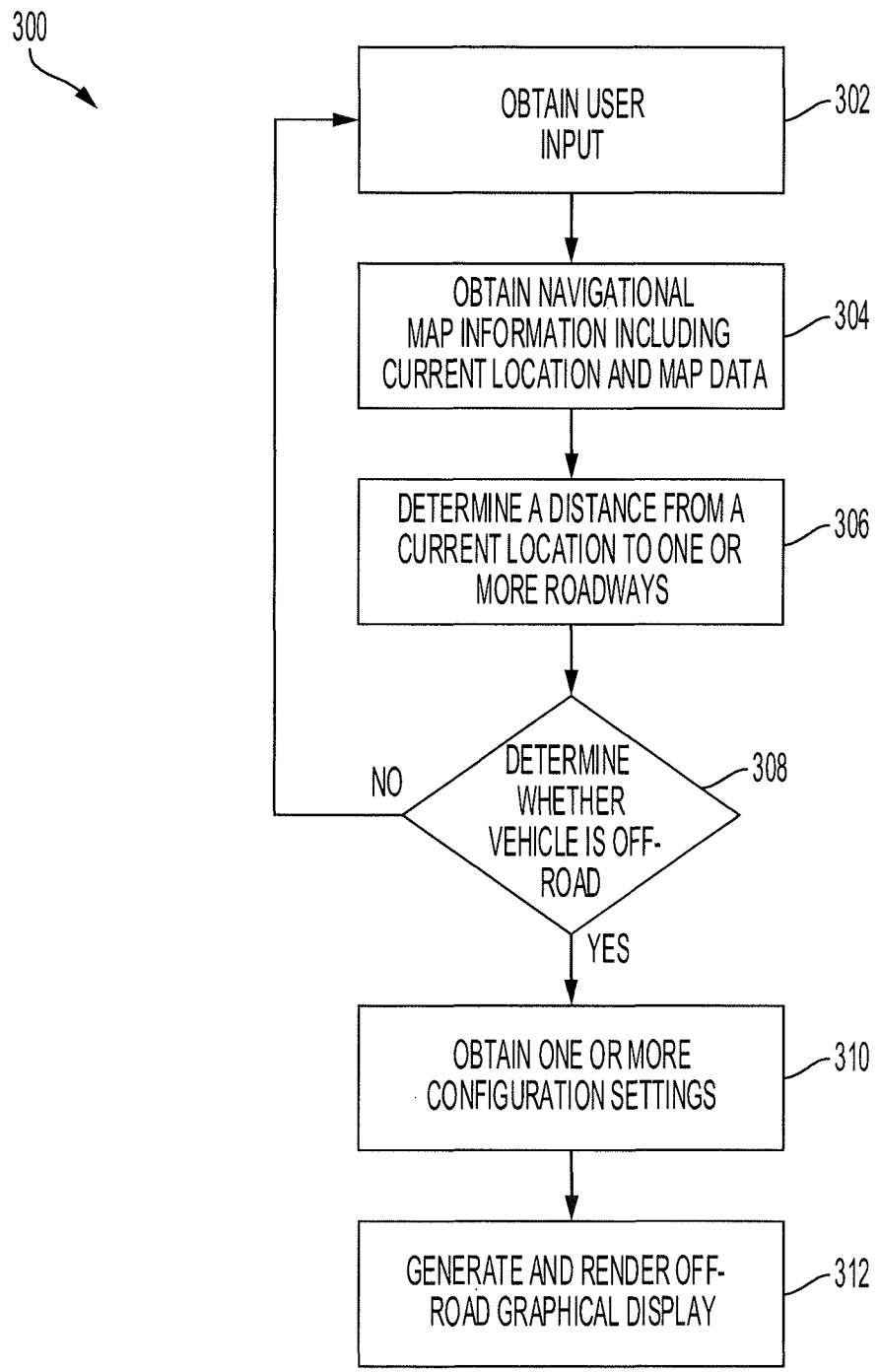
FIG. 3 is a flow diagram of an example process for determining that the vehicle is off-road using the dashboard system of FIG. 1 according to an aspect of the invention.

FIG. 3 is a flow diagram of a process 300 for determining that the vehicle 102 is off-road. One or more computers or one or more data processing apparatuses, for example, the ECU 110 of the dashboard system 100, appropriately programmed, may implement the process 300.

The dashboard system 100 may obtain user input that indicates that the user of the vehicle 102 desires to switch the display into an off-road mode, which displays visualizations of one or more parameters related to the off-road data and/or images related to the off-road data (302). The dashboard system 100 may obtain the user input via the user interface 128. For example, the dashboard system 100 may receive a user selection via a touch-screen display, a toggling or selection of one or more buttons or knobs on the dashboard and/or other user input that indicates to the dashboard system 100 to switch the display of the user interface 128 into the off-road mode to show relevant off-road information regarding the vehicle 102 or path of the vehicle 102.

The dashboard system 100 may obtain navigational map information including a current location and map data (304). The dashboard system 100 may receive the navigational map information from the navigation unit 124. The navigational map information may include the current location of the vehicle 102, date and time information, and/or map data. The dashboard system 100 may extract the current location of the vehicle 102, the date and time information, and/or the map data from the navigational map information.

In some implementations, the dashboard system 100 may obtain the map data from one or more external databases 104. The dashboard system 100 may extract the current location of the vehicle 102 from the navigational map information and provide the current location to the one or more external databases 104. In response, the one or more external databases 104 may provide and the dashboard system 100 may receive the map data surrounding or in proximity to the current location of the vehicle 102. From the map data, the dashboard system 100 may extract locations of the one or more roadways, whether paved or unpaved, and/or the locations of one or more terrain features surrounding or in proximity to the current location.

Once the dashboard system 100 has the navigational map information and/or the map data, the dashboard system 100 may determine a distance from a current location of the vehicle 102 to one or more roadways in proximity to the vehicle 102 (306). The dashboard system 100 may extract the current location of the vehicle 102 from the navigational map information and may extract the one or more locations of the one or more roadways from the map data. For example, the dashboard system 100 may parse the map data and extract the one or more locations of the one or more roadways. Then, the dashboard system 100 may compare the one or more locations of the one or more roadways with the current location of the vehicle 102 and determine the distance between the current location of the vehicle with the one or more locations of the one or more roadways based on the comparison. The dashboard system 100 may also identify whether the one or more roadways is a paved roadway or an unpaved roadway based on the map data.

The dashboard system 100 may determine whether the vehicle 102 is off-road based on the distance between the current location of the vehicle 102 and the one or more locations of the one or more roadways (308). The dashboard system 100 may determine that the vehicle 102 is not off-road when the distance between current location of the vehicle 102 and the one or more locations of the one or more roadways is less than a threshold amount, such as less than approximately 25 feet from one or more roadways. Whereas, when the distance between the current location of the vehicle 102 and the one or more locations of the one or more roadways is greater than or equal to the threshold amount, the dashboard system 100 may determine that the vehicle 102 is off-road.

The determination of whether the vehicle 102 is off-road may also be based on whether the one or more roadways is a paved road or an unpaved road. For example, when the one or more roadways is a paved road, the threshold distance may be greater than when the one or more roadways is an unpaved road because an unpaved road may be surrounded by a more rugged, rocky and/or uneven environment. The threshold distance may be approximately 25 feet when the roadway is paved and only a few feet when roadway is unpaved. In some implementations, when the vehicle 102 is on an unpaved roadway, e.g., when there is relatively no distance between the current location of the vehicle 102 and the location of the unpaved roadway, the dashboard system 100 may determine that the vehicle 102 is off-road. The threshold distance may be user-configurable along with whether driving on an unpaved road is determined to be off-road.

The dashboard system 100 may determine whether the vehicle 102 is off-road further based on other factors including one or more locations of terrain features, such as the proximity to and the number of nearby terrain features. For example, when the vehicle 102 is traveling in proximity to or on multiple rock formations, a desert, mud path or other terrain feature that may indicate that the vehicle 102 is traveling on an unpaved or non-conventional path, the dashboard system 100 may determine that the vehicle 102 is off-road. In some implementations, sensor data, such as vibrations of the shock and/or image data that indicates rugged, rock or other off-road features, may assist to determine that the vehicle 102 is off-road.

In some implementations, the dashboard system 100 may determine whether the vehicle 102 is off-road based on the user input. The user input may indicate whether the user of the vehicle 102 desires to switch the display into the off-road mode. The dashboard system 100 may determine that the vehicle 102 is off-road when the user input indicates that the user desires the off-road mode, e.g., via the user interface 128.

When the dashboard system 100 determines that the vehicle 102 is not off-road, the dashboard system 100 may continue to monitor the user input and/or obtain the navigational map information and map data (302, 304). When the dashboard system 100 determines that the vehicle 102 is off-road, the dashboard system 100 may obtain one or more configuration settings for the display (310). The one or more configuration settings may be obtained from the memory 112 and may have been pre-stored or user-inputted. The one or more configuration settings may indicate visualizations of the one or more parameters and/or the images related to the off-road data which the user desires to display. The one or more configuration settings may also indicate the position or location of the visualization or image where the visualization or the image should be displayed on the user interface 128.

The one or more configuration settings may be based on an identify of the user. For example, the dashboard system 100 may store different sets of configuration settings for different drivers and/or occupants such that the one or more configuration settings that are loaded when the vehicle 102 is off-road is different for each user, which allows for customizations between different users. The dashboard system 100 may determine the identity of the user by receiving input, e.g., from the key fob or from the user interface 128, that identifies the user, and subsequently, the dashboard system 100 may load a user profiles with the one or more configuration settings for the user.

Once the visualizations and/or images to be displayed or determined, the dashboard system 100 generates and renders the graphic user interface with the visualizations and/or images at their corresponding locations (312). The visualizations and/or images along with their corresponding locations on the graphical user interface may be based on the one or more configuration settings.

Figure 4:
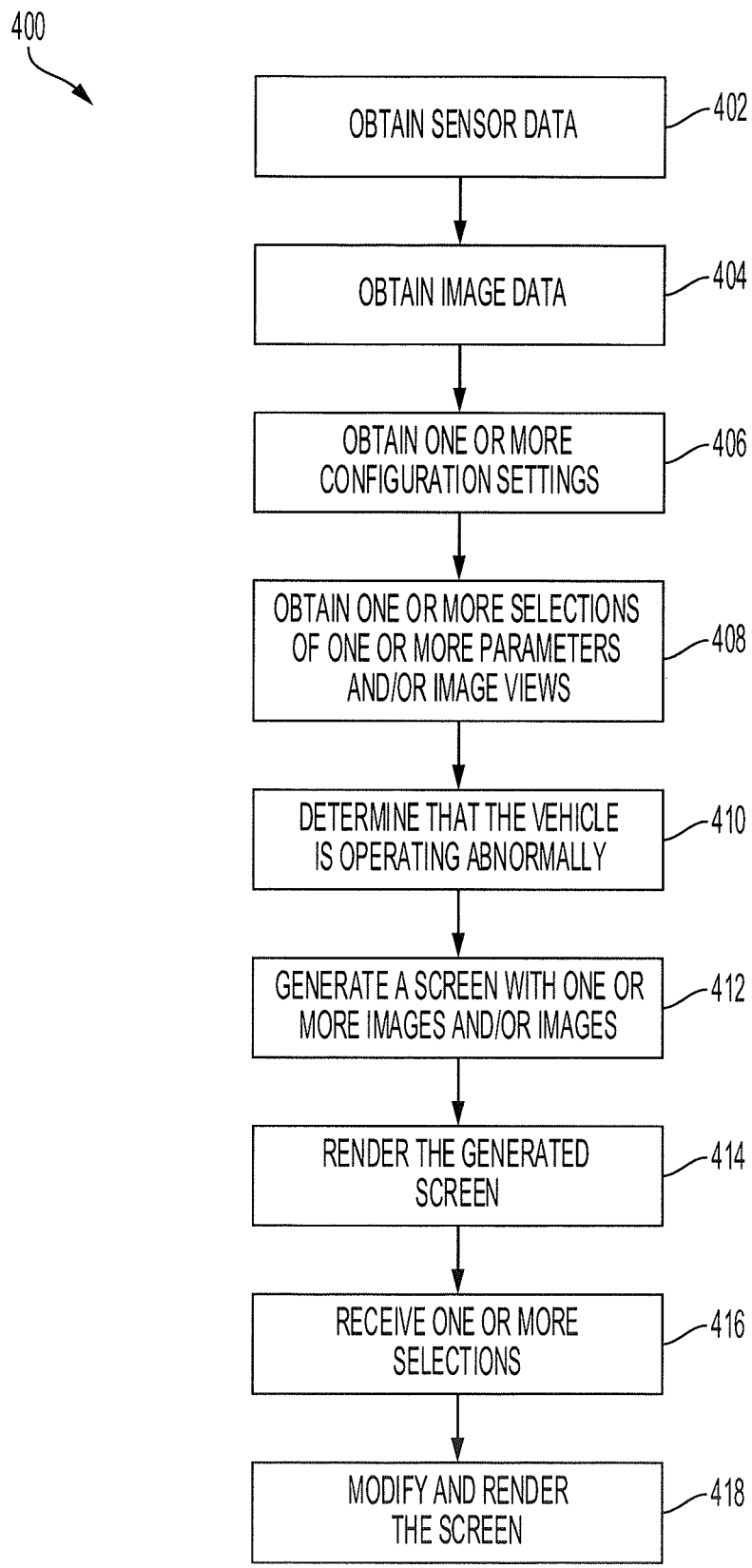
FIG. 4 is flow diagram of an example process for activating the off-road mode of the dashboard system of FIG. 1 according to an aspect of the invention.

FIG. 4 is a flow diagram of a process 400 for activating the off-road mode on the user interface 128. One or more computers or one or more data processing apparatuses, for example, the ECU 110 of the dashboard system 100, appropriately programmed, may implement the process 400.

The dashboard system 100 obtains sensor data (402). The dashboard system 100 may use the one or more sensors 126 to collect and aggregate the sensor data of one or more parameters related to the off-road data using various sensors positioned throughout the vehicle 102. For example, the dashboard system 100 may use the traction sensor 126a to detect, determine or measure a status of the traction and/or slip on all of the wheels of the vehicle 102. In another example, the dashboard system 100 may use the vehicle speed sensor 126b to measure the wheel speed of all the wheels of the vehicle or the under-body proximity sensor 126d to measure an amount of clearance and/or a distance from the under-side of the vehicle 102 to the ground. The dashboard system 100 may use other sensors to measure or detect other parameters, such as the inclination of the surface, the shock, vibration, tilt or roll of the vehicle 102, the battery voltage or other parameters related to the vehicle components of the vehicle 102.

The dashboard system 100 obtains image data (404). The dashboard system 100 may obtain the image data using the camera 126c. The camera 126c may be positioned external and/or internal to the vehicle 102. For example, the camera 126c may be a wireless action camera positioned within the passenger compartment of the vehicle 102 to capture the images of the user and/or images in front of the vehicle 102 while the vehicle 102 is travelling off-road. The camera 126c may communicate with the user interface 128 wirelessly to display the image data and/or may communicate with the memory 112 and/or the ECU 110 to store the captured image data. The captured image data may be stored in the memory 112 when a user initiates a record button on the camera 126c, for example. In another example, the camera 126c may capture images of a bird-eye view of the vehicle 102 to capture images in front of the vehicle 102 or surrounding the vehicle 102 to assist in providing direction to guide or direct the driver of the vehicle 102.

The dashboard system 100 may obtain one or more configuration settings, as described above (406). The one or more configuration settings may indicate the user preferences of which visualizations associated with one or more parameters and images associated with an image view related to the off-road data to display when the display is in the off-road mode when the vehicle 102 is off-road.

The dashboard system 100 may obtain one or more user selections of one or more parameters and/or image views to display (408). The dashboard system 100 may receive the one or more user selections via the user interface 128. The one or more user selections indicate which parameters and/or images the user desires to display and may also indicate the location or position on the display that the user desires to place or locate the visualization or image. For example, the user may select a parameter to show, such as the traction control, and drag the visualization to a bottom-left corner of the display to display the visualization of the parameter at the bottom-left corner of the display. The user may select multiple parameters and/or image views to display. For example, in addition to the traction control visualization, the user may select a front-camera view in front of the vehicle 102 and draft the image to the top-right corner of the display to display images from the front-camera view in the top-right corner of the display.

The dashboard system 100 may determine that the vehicle 102 is operating abnormally (410). The dashboard system 100 may determine that the vehicle 102 is operating abnormally based on the sensor data. The vehicle may be operating abnormally when one or more parameters exceed a threshold value or range that indicates that a component associated with the one or more parameters is operating within normal operating conditions and/or exceeds a hardware, software or safety limitation. For example, when the sensor data indicates that the vibration of the suspension system, the tilt or roll of the vehicle 102, or the slip of the vehicle 102 exceeds a threshold value, the dashboard system 100 may issue an alert or notification to notify the user via the screen on the display.

The dashboard system 100 generates a screen with one or more visualizations of the one or more parameters and/or the one or more images of the one or more image views related to the off-road data (412). The data shown in the one or more visualizations and/or the one more images may be based on the collected sensor data and/or image data, respectively. The dashboard system 100 may generate visualizations from the sensor data, such as a bar graph, a gauge, a numerical value, an alert, a notification or other graphical visualization that conveys the value of the corresponding parameter associated with the visualization or an indication that the parameter exceeds a threshold value. For example, a bar graph may show a representation of the state of charge of the battery, the amount of traction or slip on each wheel, the amount of vibration, shock, roll, or tilt of the vehicle, and/or the speed of each wheel or other representation of the numerical value associated with the parameter.

The dashboard system 100 may generate or extract images from the image data. The images may be the raw images from the captured image data and/or may include processed information on the capture image data, such as object recognition to identify hazards within the different image views captured in the image data.

The dashboard system 100 may generate the screen based on the user selection and/or the one or more configuration settings. The dashboard system 100 may initially generate the screen by placing the one or more visualizations and/or the one or more images indicated to be included on the screen at their corresponding locations indicated in the one or more configurations settings. Then, the dashboard system 100 may modify the placement and/or inclusion of one or more visualizations and/or images based on the user selection of one or more parameters and/or image views. The user selected visualizations and/or images with their corresponding locations may override the one or more configuration settings, e.g., a user selected image or visualization may replace an initial visualization or an initial image included due to a configuration setting on the screen.

In some implementations, when there are no configuration settings and there are only one or more user selections, the dashboard system 100 builds the screen from the one or more user selections. The dashboard system 100 positions the one or more visualizations and/or one or more images at the corresponding location or position indicated in the user selection to form the screen.

In some implementations, the dashboard system 100 generates the screen based on the determination that the vehicle 102 is performing abnormally. When the sensor data indicates that the vehicle 102 is performing abnormally, e.g., when the parameter is operating outside normal conditions, the dashboard system 100 may generate a visualization on the screen that shows the parameter and/or the value of the parameter that exceeds the threshold value along with an alert or notification and/or may show images of the components or obstacles that may be the cause of the abnormal behavior. For example, if the traction control or clearance underneath the vehicle is below a certain value or the slip, tilt or roll of the vehicle 102 exceeds a certain value, the dashboard system 100 may generate the screen with one or more images of the wheel or the driving surface near the wheel to assist the user in identifying the cause of the abnormal behavior.

The dashboard system 100 renders the generated screen with the one or more visualizations and/or one or more images on the user interface 128 (414). The dashboard system 100 renders the generated screen with the one or more visualizations and/or the one or more images at the indicated location or position in the user selection or configuration setting. If there is no indicated location or position, the dashboard system 100 may render the generated screen at a factory default location.

Once the screen with the one or more visualizations and/or the one or more images are generated, the dashboard system 100 may receive one or more user selections to modify the screen that is displayed on the user interface 128 (416). The one or more user selections may be of a visualization or image already on the screen or another visualization of another parameter or another image of another image view that the user desires to be displayed on the screen. The one or more user selections may indicate to add, remove or move the selected visualization or image. For example, the user selection may indicate to add a second visualization associated with a second parameter related to the off-road data and/or a second image associated with an image view related to the off-road data onto the screen. In another example, the user selection may indicate to remove the first visualization or first image, which may already exist on the screen, or to move the first visualization or the first image from a current location or position on the screen to another different location or position on the screen.

The one or more user selections may also indicate a location or a position on the screen to move the selected visualization or image. For example, the user may select a first visualization that is currently located in the top-right corner of the screen and drag the first visualization to the bottom-left corner. Thus, the selection of the first visualization would indicate that the first visualization moves from a first coordinate or point in the top-right corner to a second coordinate or point in the bottom-left corner. In another example, the user may select the first visualization and move the first visualization off-screen, and so, the selection and subsequent movement off-screen may indicate that the first visualization is to be removed from the screen.

The various modifications may include various features to change the shape, size and/or orientation of the visualization and/or image. The various features may include zooming in and out of one or more visualizations and/or images, expanding the one or more visualizations and/or images to encompass the entire screen or more than a single portion of the screen, and/or miniaturizing the one or more visualizations and/or images to encompass a single portion of the screen. Each portion of the screen may allow for a visualization and/or an image to be displayed. The different portions may have different sizes and shapes based on the customization of the user. The various features and customizations of the display improve the capability and flexibility of viewing one or more visualizations and/or images on the dashboard of the vehicle 102 and allow the user to customize the preferred data to be viewed when off-roading along with the manner in which the data is viewed.

Once the one or more user selections are received, the dashboard system 100 modifies and renders the screen with the one or more visualizations and the one or more images (418). The dashboard system 100 renders the generated visualizations of the parameters and/or the images of the different image views that were selected and presents the visualizations and/or images on the display of the user interface 128. The one or more user selections may indicate a position or a location to move or place the one or more visualizations and/or images. The dashboard system 100 renders the selected visualizations and/or the selected images in their corresponding positions or locations that were indicated with the one or more user selections.

Figure 5A:
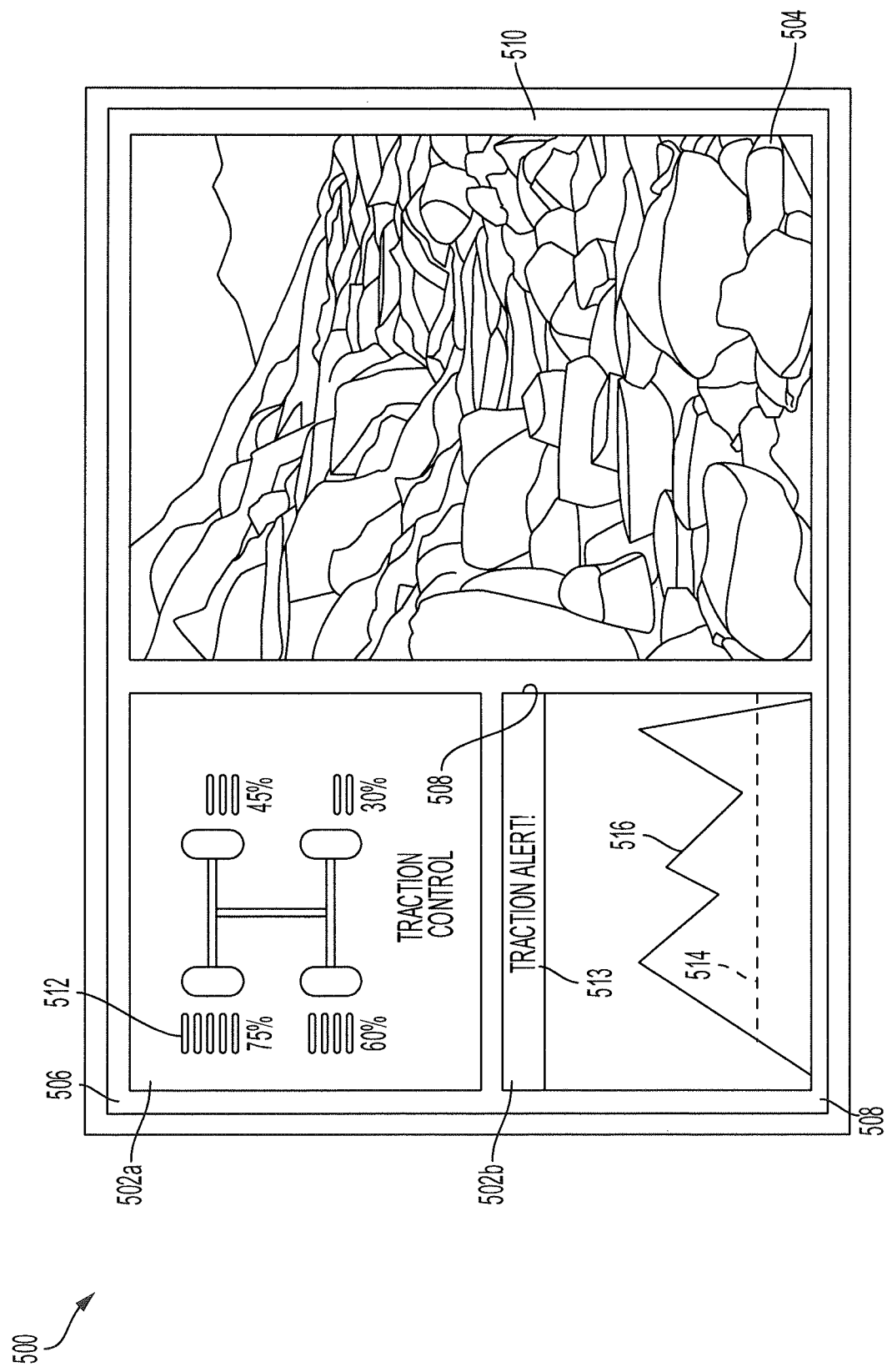
FIG. 5A shows an example screen of the dashboard system of FIG. 1 that has one or more visualizations and/or images according to an aspect of the invention.

FIG. 5A shows the screen 500 on the display of the user interface 128 that has one or more visualizations 502*a-b* and/or images 504. The electronic control unit 110 may render the one or more visualizations 502*a-b* and/or images 504 on the screen 500. For example, the dashboard system 100 may render the first visualization 502*a* in the top-left corner 506 and may be of a first size. The first visualization 502*a* may correspond to the amount of traction of the wheels of the vehicle 102, individually, or other parameter related to the off-road data. The first visualization 502*a* may have one or more visual indicators 512, such as a gauge and/or a numerical value, that indicate the value of the parameter. The dashboard system 100 may render the second visualization 502*b* in the bottom-left corner 508 and may be of a second size. The second visualization 502*b* may correspond to the amount of traction of the wheels in the aggregate or other parameter related to the off-road data. The second visualization 502*b* may have an alert 513 when the value 516 of the parameter, e.g., the traction, exceeds a threshold value 514 that indicates an abnormal condition. The dashboard system 100 may render a first image 504 on the right-side 510 of the screen 500. The first image 504 may have a third size that is larger than the first size and/or the second size. The first image may be captured image data of a view in front of the vehicle 102 that may be causing the alert 513, for example.

Figure 5B:
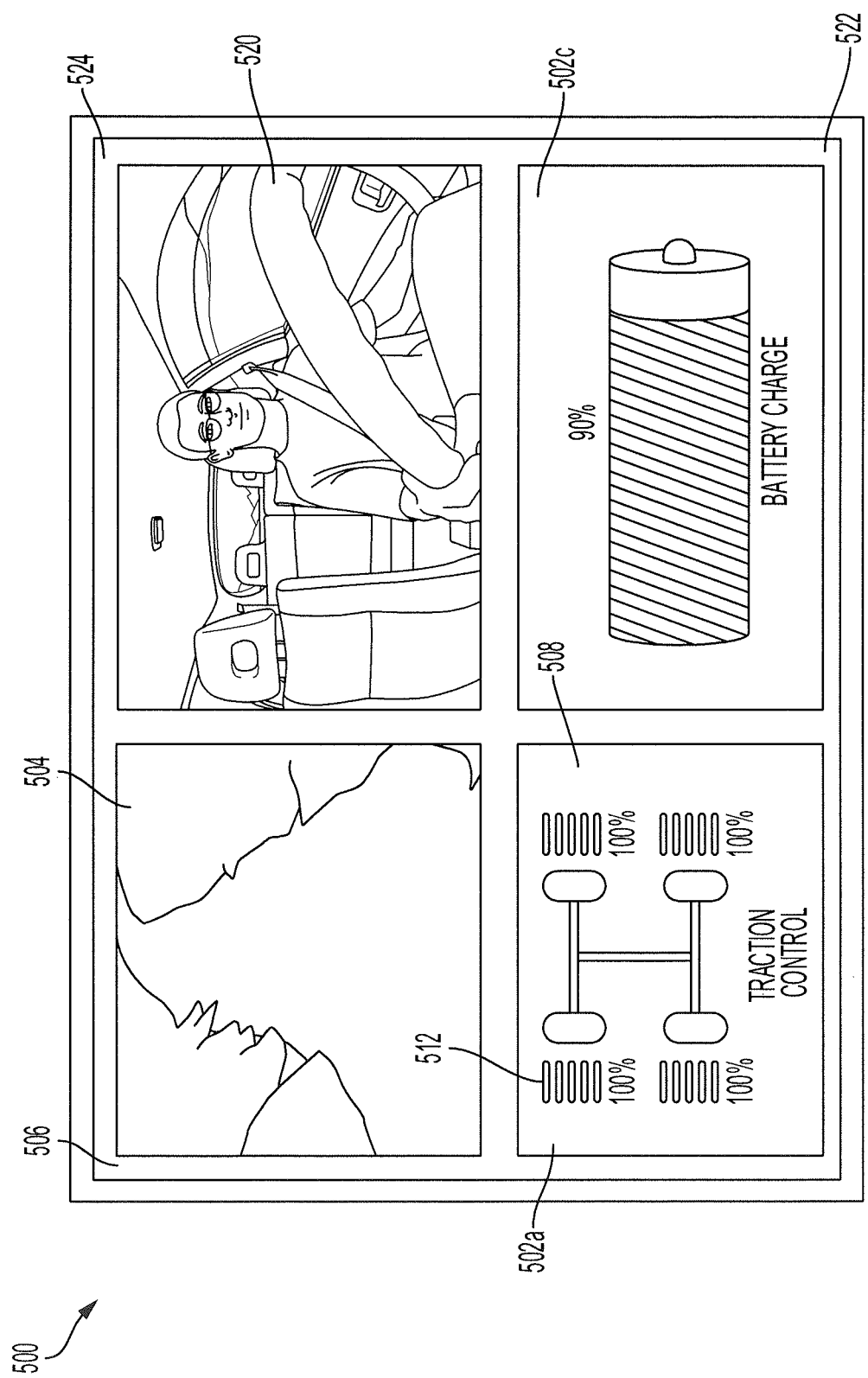
FIG. 5B shows another example screen of the dashboard system of FIG. 1 with one or more visualizations and/or images in different portions of the screen in FIG. 5A according to an aspect of the invention.

FIG. 5B shows the screen 500 on the display of the user interface 128 that has been modified from FIG. 5A. based on one or more user selections. The screen 500 has four portions in FIG. 5B, whereas, the screen 500 had three portions in FIG. 5A. The first visualization 502*a* that shows the parameter related to the traction control has moved from the top-left corner 506 to the bottom-left corner 508 of the screen 500. Moreover, a third visualization 502*c* that shows the state of charge of the battery 118 has been added in the bottom-right corner 522 and a second image 520 that shows an internal view of the vehicle 102 has been added in the top-right corner 524. Additionally, the first image 504 of the view in front of the vehicle 102 may be minimized and positioned in the top-left corner 506. The second visualization 502*b* may also have been removed from the screen 500.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A configurable dashboard system for an off-road vehicle, comprising:
    a sensor configured to detect or measure sensor data that includes a first parameter related to the off-road vehicle;
    a user interface configured to display visualizations related to parameters of the off-road vehicle and images related to the off-road vehicle; and
    a processor coupled to the sensor and the user interface and configured to:
        obtain, from the sensor, the first parameter of the off-road vehicle,
        render on the user interface a first visualization related to the first parameter,
        obtain, using the user interface, a selection of a second visualization related to a second parameter of the off-road vehicle to display on the user interface,
        modify the first visualization on the user interface; and
        render on the user interface the second visualization related to the second parameter along with the modified first visualization.

2. The configurable dashboard system of claim 1, further comprising:
    a navigation unit configured to obtain a current location of the off-road vehicle and map data;
    wherein the processor is coupled to the navigation unit and configured to:
        compare the current location of the off-road vehicle to the map data,
        determine that the off-road vehicle is off-roading, and
        render the first visualization related to the first parameter in response to the determination that the off-road vehicle is off-roading.

3. The configurable dashboard system of claim 1, wherein the sensor is a traction sensor that is configured to measure an amount of traction or wheel slip of a wheel, wherein the first parameter includes the amount of traction or slip of each wheel of a plurality of wheels of the off-road vehicle.

4. The configurable dashboard system of claim 1, further comprising:
    a front-view camera configured to capture a first image of an environment in a path of the off-road vehicle, wherein the processor is configured to:
    render on the user interface the first image along with the first visualization or the second visualization.

5. The configurable dashboard system of claim 4, wherein the processor is configured to:
    swap on the user interface the first image with the second visualization related to the second parameter or the first visualization related to the first parameter so that the first image is rendered on the user interface with the other of the second visualization or the first visualization.

6. The configurable dashboard system of claim 1, further comprising:
    a memory configured to store one or more configuration settings that indicate a corresponding position for each visualization and each image to be displayed on the user interface;
    wherein the processor is coupled to the memory and configured to:
        receive the one or more configuration settings,
        render on the user interface the first visualization at a first position based on the one or more configuration settings, and
        render on the user interface the second visualization at a second position based on the one or more configurations.

7. The configurable dashboard system of claim 1, wherein the processor is configured to:
    receive user input that indicates a selection and movement of the first visualization from a first location to a second location; and
    move on the user interface the first visualization from the first location to the second location.

8. The configurable dashboard system of claim 1, wherein the first parameter and the second parameter includes at least one of an amount of traction or wheel slip of each wheel of a plurality of wheels of the off-road vehicle, or an amount of oscillation, vibration or shock to a suspension of each wheel of the plurality of wheels of the off-road vehicle.

9. A configurable dashboard system for an off-road vehicle, comprising:
    a first sensor configured to detect a first parameter of the off-road vehicle;
    a second sensor configured to detect a second parameter of the off-road vehicle;
    a graphical user interface configured to display visualizations of parameters and images of the off-road vehicle or off-road trip; and
    a processor coupled to the first sensor, the second sensor and the graphical user interface and configured to:
        render on the graphical user interface a first visualization related to the first parameter at a first position on the graphical user interface and a second visualization related to the second parameter at a second position on the graphical user interface,
        obtain a selection of a first image or a third visualization to be rendered on the graphical user interface,
        modify the first visualization on the graphical user interface, and
        render on the graphical user interface the first image or the third visualization at a third position along with the second visualization and the modified first visualization.

10. The configurable dashboard system of claim 9, further comprising:
    a navigation unit configured to obtain a current location of the off-road vehicle and map data;
    wherein the processor is coupled to the navigation unit and configured to:
        compare the current location of the off-road vehicle to the map data,
        determine that the off-road vehicle is off-roading, and
        render the first visualization related to the first parameter and the second visualization related to the second parameter in response to the determination that the off-road vehicle is off-roading.

11. The configurable dashboard system of claim 9, wherein the first sensor is a traction sensor that is configured to measure an amount of traction or wheel slip of a wheel, wherein the first parameter includes the amount of traction or wheel slip of each wheel of a plurality of wheels of the off-road vehicle.

12. The configurable dashboard system of claim 9, further comprising:
a front-view camera configured to capture the first image of an environment in a path of the off-road vehicle, wherein the processor is configured to:
render on the graphical user interface the first image along with the first visualization related to the first parameter and the second visualization related to the second parameter.

13. The configurable dashboard system of claim 9, further comprising:
a memory configured to store one or more configuration settings that indicate the visualizations of parameters and the images to display on the graphical user interface along with a corresponding position for each visualization and each image;
wherein the processor is coupled to the memory and configured to:
receive the one or more configuration settings, and
render on the user interface the first visualization at the first position based on the one or more configuration settings.

14. The configurable dashboard system of claim 9, wherein the processor is configured to:
receive user input that indicates a selection of an off-road mode; and
render on the graphical user interface the first visualization related to the first parameter at the first position on the graphical user interface and the second visualization related to the second parameter at the second position on the graphical user interface when the off-road mode is selected.

15. The configurable dashboard system of claim 9, wherein the first parameter and the second parameter includes at least one of an amount of traction or wheel slip of each wheel of a plurality of wheels of the off-road vehicle, an amount of oscillation, vibration or shock to a suspension of each wheel of the plurality of wheels of the off-road vehicle, or an amount of viewing area on each window of the off-road vehicle.

16. A method of displaying parameters and images related to off-roading, comprising:
detecting or measuring, by a first sensor, a first parameter of a vehicle that is off-road;
rendering, by a processor and on a display, a first visualization of related to the first parameter;
obtaining, using a user interface, a selection of a second visualization related to a second parameter of the off-road vehicle to display;
detecting or measuring, by a second sensor, the second parameter of the vehicle;
modifying, by the processor, the first visualization on the user interface; and
rendering, by the processor and on the display, a second visualization related to the second parameter along with the modified first visualization.

17. The method of claim 16, wherein modifying the first visualization on the user interface includes:
changing a shape, a size or an orientation of the first visualization to fit the second visualization and the modified first visualization on the display.

18. The method of claim 16, wherein determining that the vehicle is off-road includes:
determining one or more locations of one or more roadways using map data;
comparing a current location of the vehicle with the one or more locations of the one or more roadways; and
determining that the current location of the vehicle is not within a threshold distance of any of the one or more locations of the one or more roadways.

19. The method of claim 16, wherein the first parameter and the second parameter includes at least one of an amount of traction or wheel slip of each wheel of a plurality of wheels of the vehicle, an amount of oscillation, vibration or shock to a suspension of each wheel of the plurality of wheels of the vehicle, an amount of viewing area on each window of the vehicle, an amount of under-body clearance, or an amount of battery voltage, engine oil level, transmission temperature or transmission oil level.

20. The configurable dashboard system of claim 1, wherein to modify the first visualization on the user interface the electronic control unit is configured to:
change a shape, a size or an orientation of the first visualization to fit the second visualization and the modified first visualization on the user interface.

* * * * *